3,223,053
TORTILLA MACHINE
James A. Jimenez and Harold H. Olmsted, both of 6252 N. Hart Ave., Temple City, Calif.
Filed Oct. 23, 1962, Ser. No. 232,497
3 Claims. (Cl. 107—4)

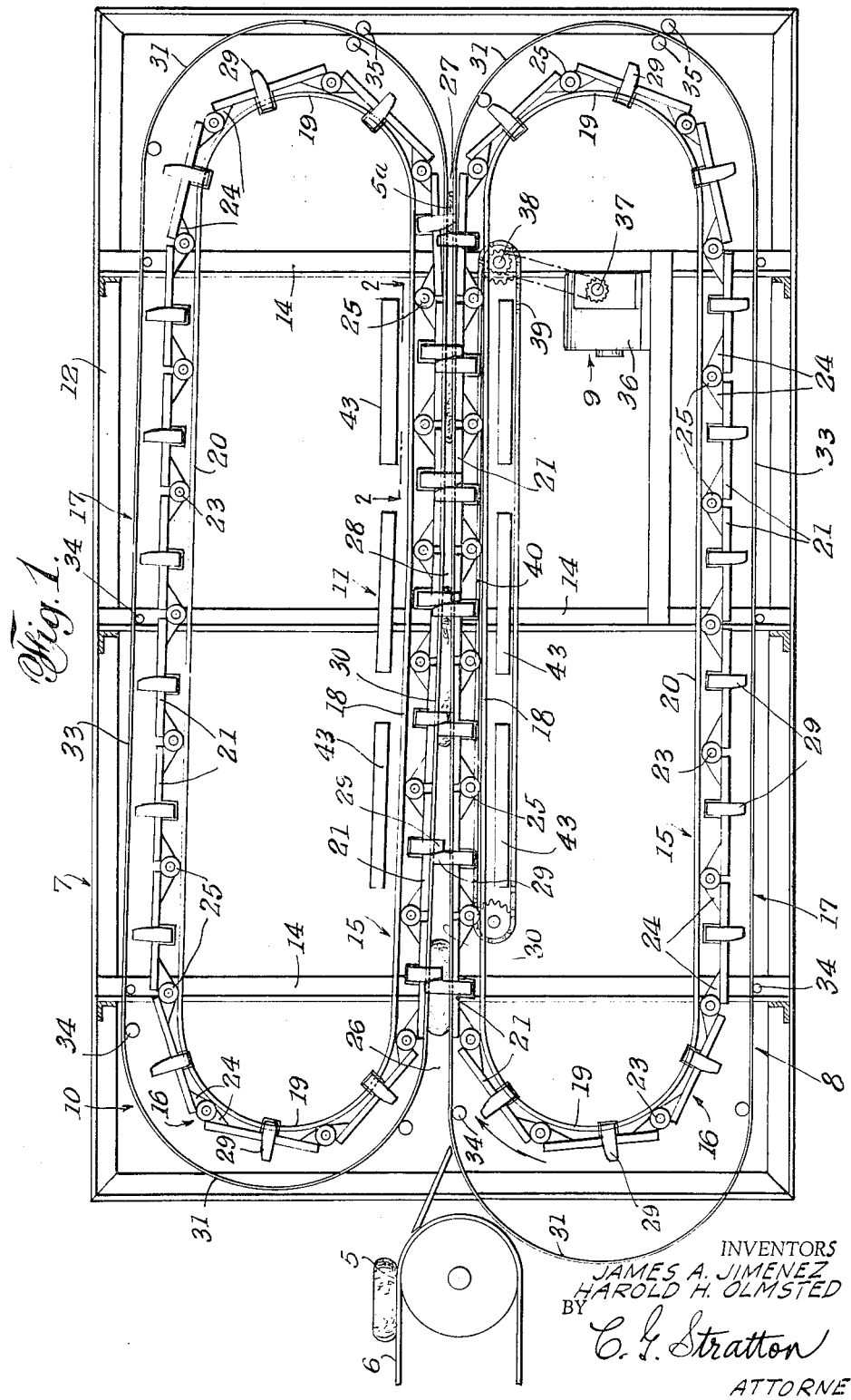

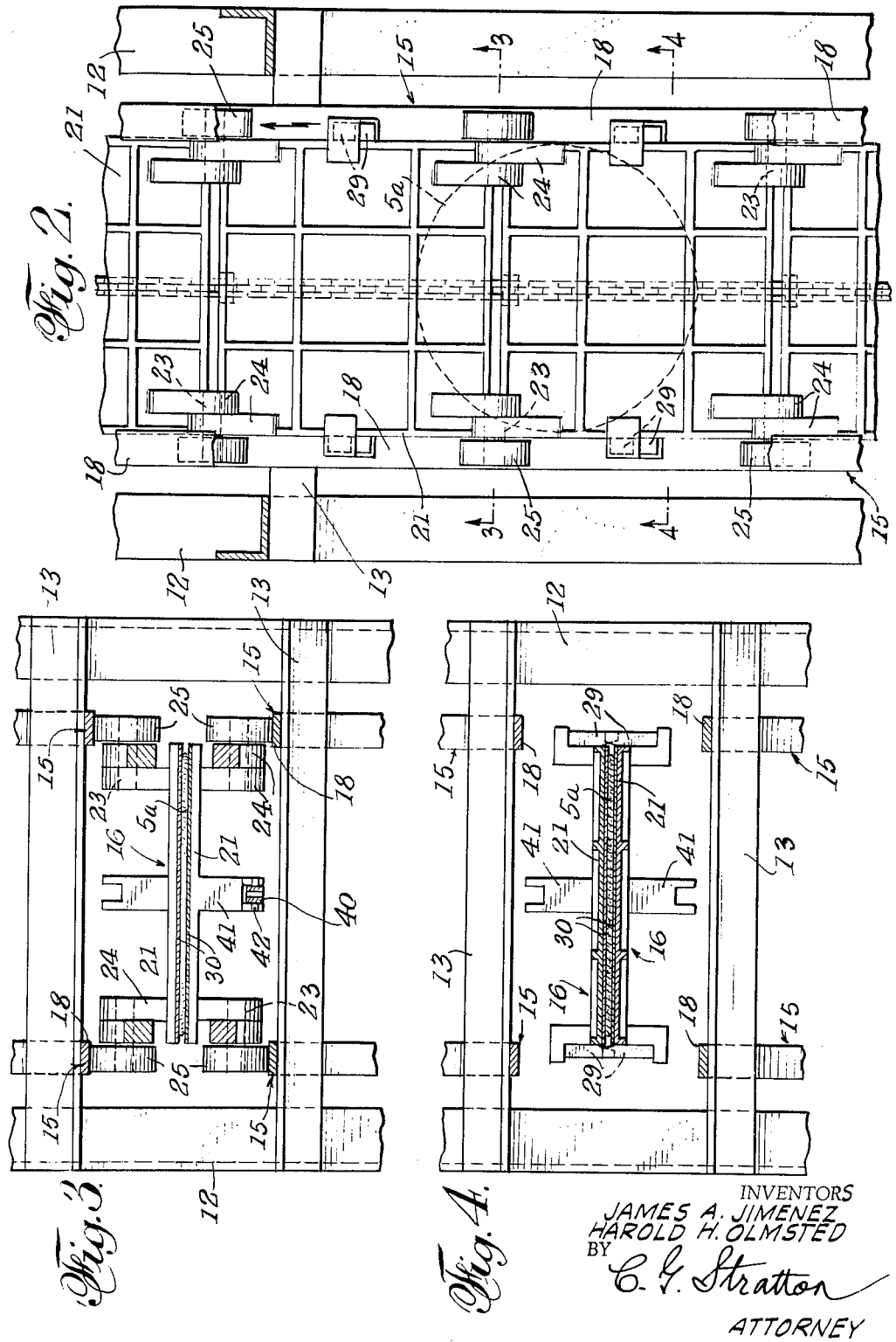

This invention relates to a machine for forming flat sheets of dough such as or resembling tortillas.

An object of the invention is to provide a sheet-forming machine that forms tortillas in a continuous manner.

Another object of the invention is to provide a tortilla-producing machine that flattens tortillas from slugs of dough in a continuous manner that obviates the peripheral portion of the finished tortilla becoming cracked or otherwise malformed.

A further object of the invention is to provide a tortilla machine that provides uniformly thin sheets of even thickness and consistency.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a longitudinal sectional view of a tortilla machine according to the present invention.

FIG. 2 is an enlarged and fragmentary plan view as take on the line 2—2 of FIG. 1.

FIGS. 3 and 4 are cross-sectional views as taken on the respective lines 3—3 and 4—4 of FIG. 2.

The present machine may be continuously fed with slugs or units of dough 5 by means of a conveyor 6 or the like. In practice, said dough units are batched in a circular form of desired thickness with the peripheral portion thereof rounded to impart uniformity to the units as regards roundness and thickness.

The tortilla machine that is illustrated comprises, generaly, a frame 7, a lower conveyor unit 8 upon which the dough units 5 are deposited one after the other, a drive 9 for said conveyor unit, a cooperating conveyor unit 10 between which and the unit 8 the dough units are compressed and, while compressed, moved to the discharge end of the machine, and means 11 to heat the units 8 and 10 to, thereby, heat dough units 5 being flattened into tortillas during progress thereof through the machine.

The frame 7 is of generally parallelepiped form with side rectangular frame portions 12 connected by cross members 13, vertical members 14 being provided in the frame portions as needed. In the present machine, the conveyor units 8 and 10 operate in the space between the frame sides 12, as best seen in FIGS. 2, 3 and 4.

The two conveyor units are quite similar, except that the driven unit 8 effects separable coupling with the drive 9 and that the lower conveyor unit 8 is longer than the unit 10, so as to facilitate deposit thereon of dough units 5. Hence, the following description of the unit 8 will serve also to describe the unit 10.

The unit 8 comprises, generally, a pair of inner tracks 15 of endless form, an endless articulated belt 16 tracking around said tracks 15, and an outer flexible and endless band 17 around the belt 16.

The tracks 15 are shown as endless guide means formed of strap metal to have a straight run portion 18, end bight portions 19, and a return run portion 20. Said tracks are transversely spaced and are inward of and adjacent to the frame sides 12.

The belt 16 comprises a plurality of plates 21 that are connected in end-to-end relation by pivots 23 which pivotally join lugs 24 that are directed toward the runs and bights of the tracks 15. Said pivots constitute axles for rollers 25 that roll on said tracks.

The tracks 15 of the respective conveyor units 8 and 10 are so disposed relative to each other that, when the same are adjacent to the feed conveyor 6, they are more separated than at the opposite end of the runs 18. Thus, the two belts 16 are similarly separated to define an entry throat 26 for dough units 5 that is substantially larger than the space 27 at the opposite end of said belts, said latter space being of a size according to the desired thickness of the tortillas produced by the machine. The dough-flattening space may reduce uniformly from the throat 26 to the space 27 but, as shown in FIG. 1, the reduction may be continuous to a mid portion between said throat and space to about the point 28. From that point to the end space 27, the spacing between the belts may be uniform.

Each plate 21 of the belt 16, perferably at both side edges thereof, is provided with a dog 29 that extends in a direction away from the tracks 15. Thus, the dogs 29 of the lower driven conveyor will encounter the dogs of the upper conveyor to impart to the latter the movement of the former. In this simple manner, the two conveyors are driven together, one by the other, the arrangement being such that several dogs on each conveyor have simultaneous drive engagement.

Flexible band 17 is loosely trained around the belt 16 so that the run 30 thereof lies flat against the plates 21 on the run 18 of the tracks, the end bights 31 are spaced away from the plates on the bights 19 of said tracks, and the return run 33 is spaced from the plates on the return run 20 of the tracks. The spaced-away portions of the band 17 may be trained over idler rollers 34 and, if desired, a friction drive, as the rollers 35 may be used for said band. The same is representative of means to drive said band. The runs 30 of the bands 17 of the cooperating conveyor units 8 and 10 serve to line the opposed faces of the plates 21 of the two endless belts 16 of said conveyor units to form smooth dough-flattening sheet-like surfaces that, in the progressive manner above indicated, flatten a dough unit 5 to the flat form and larger size as at 5a, as shown in the several views. It is in this flat form that the tortillas are discharged from the space 27 at the end of the machine for further processing having no connection with the present invention.

The drive 9 is shown as a geared motor 36 that has a reduced speed output shaft 37 that drives the shaft 38 of a sprocket and chain drive 39. A run 40 of the chain of said drive is at least partly coextensive with the plates 21 on the run 18 of the tracks 15 of the lower conveyor unit 8. Extensions 41 on each said plate 21 are engaged by laterally extending pins 42 of said chain to impart the movement of the chain to the lower endless belt 16. As said chain is driven, the same successively picks up the extensions 41 of the successive plates 21 to drive said lower belt. The interengaged dogs 29 of the upper and lower belts impart said movement of the lower belt to the upper belt. The engagement between the respective belts 16 and bands 17 provides a drive for the latter. In the above manner, the successive dough units 5 fed into the throat 26 are progressively flattened while being transported toward the discharge end of the machine.

The conveyor units, especially the bands 17 thereof, are heated by the means 11, the same being here shown as heaters 43 disposed on opposite sides of the runs of the conveyors between which the tortillas are formed. Said tortillas are thus pre-baked to have a somewhat more rigid form than would uncooked dough. Also, the heated bands 17 provide for non-adhering release of the tortillas at the discharge thereof.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. In a tortilla machine, a dough-flattening and conveying unit comprising
    (a) a fixed endless track having a generally straight run therein,
    (b) an articulated endless belt of hinge-connected flat plates provided with rollers to track around said track, thereby forming a straight run in said belt where the same is engaged with the straight run of the track,
    (c) a loose endless band trained around the belt and having a straight and flat run in flat engagement with the flat plates of the belt and constituting a dough-flattening surface,
    (d) a drive for said belt having separable driving connection with the plates of said belt while in the mentioned straight run thereof,
    (e) a second and similar dough-flattening and conveying unit with the straight run of the endless band thereof in opposed relation with the flat run of the first endless band, and
    (f) a separable interengaged driving connection between the plates of the endless belts that are in the runs thereof.

2. In a tortilla machine according to claim 1, the straight runs of the endless bands being spaced further apart at the incoming end of the runs than at the opposite end, to flatten dough therebetween progressively.

3. In a tortilla machine according to claim 1, means to heat said straight and flat runs of the two bands from opposite sides thereof.

References Cited by the Examiner
UNITED STATES PATENTS

| | | | |
|---|---|---|---|
| 544,670 | 8/1895 | Ingison | 100—96 |
| 724,588 | 4/1903 | Koneman | 25—99 |
| 1,391,805 | 9/1921 | Subers. | |
| 2,790,398 | 4/1957 | Orr. | |
| 2,975,470 | 3/1961 | Snelson et al. | |

FOREIGN PATENTS

| | | |
|---|---|---|
| 6,865 | 3/1903 | Great Britain. |
| 102,765 | | Germany. |
| 24,534 | 12/1956 | Germany. |

WALTER A. SCHEEL, *Primary Examiner.*

JOSEPH D. BEIN, *Examiner.*